United States Patent
Shen et al.

(10) Patent No.: US 12,278,595 B2
(45) Date of Patent: Apr. 15, 2025

(54) CLEANING ROBOT AND CLEANING METHOD

(71) Applicant: SUZHOU IFBOT INTELLIGENT TECHNOLOGY CO., LTD., Suzhou (CN)

(72) Inventors: Xiangbo Shen, Suzhou (CN); Xiangming Dun, Suzhou (CN); Wujun Chen, Suzhou (CN); Zhongliang Jing, Suzhou (CN); Xiangyong Dun, Suzhou (CN); Lei Shan, Suzhou (CN); Xincheng Lu, Suzhou (CN); Jiageng Chen, Suzhou (CN); Ying Gao, Suzhou (CN); Sihai Zhou, Suzhou (CN); Hongbo Zhou, Suzhou (CN); Zhixiong Hu, Suzhou (CN)

(73) Assignee: SUZHOU IFBOT INTELLIGENT TECHNOLOGY CO., LTD., Suzhou (CN)

( * ) Notice: Subject to any disclaimer, the term of this patent is extended or adjusted under 35 U.S.C. 154(b) by 492 days.

(21) Appl. No.: 17/629,355

(22) PCT Filed: Jun. 17, 2021

(86) PCT No.: PCT/CN2021/100591
§ 371 (c)(1),
(2) Date: Jan. 21, 2022

(87) PCT Pub. No.: WO2022/057346
PCT Pub. Date: Mar. 24, 2022

(65) Prior Publication Data
US 2022/0360212 A1    Nov. 10, 2022

(30) Foreign Application Priority Data

Sep. 15, 2020  (CN) .......................... 202010969174.4

(51) Int. Cl.
*H02S 40/10* (2014.01)
*B08B 1/12* (2024.01)
(Continued)

(52) U.S. Cl.
CPC ................ *H02S 40/10* (2014.12); *B08B 1/12* (2024.01); *B08B 1/30* (2024.01); *B08B 1/32* (2024.01)

(58) Field of Classification Search
CPC .... B08B 1/12; B08B 1/32; B08B 1/30; H02S 40/10; F24S 40/20; Y02E 10/40
(Continued)

(56) References Cited

FOREIGN PATENT DOCUMENTS

| CN | 205504824 U | 8/2016 |
|---|---|---|
| CN | 206752389 U | 12/2017 |

(Continued)

*Primary Examiner* — Katina N. Henson
(74) *Attorney, Agent, or Firm* — SZDC Law PC (57) ABSTRACT

A cleaning robot includes a supporting mechanism, cleaning mechanisms and a walking mechanism. The supporting mechanism is used for supporting the cleaning robot; the cleaning mechanisms are symmetrically arranged at the two ends of the supporting mechanism and can clean the surface of a photovoltaic panel; the walking mechanism is arranged in the middle of the supporting mechanism and can fix the cleaning robot to the surface of the photovoltaic panel and drive the cleaning robot to move on the surface of the photovoltaic panel; and the supporting mechanism can adjust the cleaning ranges of the cleaning mechanisms, so that the cleaning mechanisms at least have a first cleaning range and a second cleaning range, and the first cleaning range and the second cleaning range can be concentric circles. The cleaning robot is small and exquisite in structure and light. One person can operate multiple robots at the same time.

18 Claims, 8 Drawing Sheets

(51) Int. Cl.
  *B08B 1/30*   (2024.01)
  *B08B 1/32*   (2024.01)
(58) Field of Classification Search
  USPC ..................................... 15/77, 246; 134/6, 4
  See application file for complete search history.

(56) References Cited

FOREIGN PATENT DOCUMENTS

| | | | |
|---|---|---|---|
| CN | 108262277 A | | 7/2018 |
| CN | 110576016 A | * | 12/2019 |
| CN | 210172036 U | | 3/2020 |
| CN | 111974729 A | | 11/2020 |
| CN | 212681804 U | | 3/2021 |
| CN | 217550552 U | * | 10/2022 |
| JP | 2018026895 A | | 2/2018 |
| JP | 6336486 B2 | | 6/2018 |
| JP | 2019500063 A | | 1/2019 |
| KR | 101579036 B1 | | 12/2015 |
| KR | 20200103931 A | | 9/2020 |
| WO | WO-2018053985 A1 | * | 3/2018 |
| WO | WO-2019171400 A1 | * | 9/2019 |
| WO | 2020149508 A1 | | 7/2020 |

\* cited by examiner

```
┌─────────────────────────────────────────────────────────────┐
│ The cleaning robot is placed on the photovoltaic panel to   │
│ be cleaned, and it begins to walk longitudinally on the     │
│ photovoltaic panel to clean dust                            │
└─────────────────────────────────────────────────────────────┘
                              │
                              ▼
┌─────────────────────────────────────────────────────────────┐
│ The walking mechanism drives the cleaning mechanism to      │
│ rotatably clean within the first and second cleaning ranges │
└─────────────────────────────────────────────────────────────┘
                              │
                              ▼
┌─────────────────────────────────────────────────────────────┐
│ The walking mechanism drives the cleaning robot to travel   │
│ longitudinally upward for a certain distance, so that the   │
│ cleaning robot begins to walk longitudinally on the         │
│ photovoltaic panel to clean dust                            │
└─────────────────────────────────────────────────────────────┘
                              │
                              ▼
┌─────────────────────────────────────────────────────────────┐
│ When the cleaning robot reaches the side edge of the        │
│ photovoltaic panel, it begins to walk a certain distance    │
│ laterally to perform the cleaning again                     │
└─────────────────────────────────────────────────────────────┘
```

FIG. 13

CLEANING ROBOT AND CLEANING METHOD

This application is the National Stage Application PCT/CN2021/100591, filed on Jun. 17, 2021, which claims priority to Chinese Patent Application No. 202010969174.4, filed on Sep. 15, 2020, which is incorporated by reference for all purposes as if fully set forth herein.

FIELD OF THE INVENTION

The present invention relates to the technical field of photovoltaic panel cleaning devices, in particular to a cleaning robot.

BACKGROUND OF THE INVENTION

With the intensification of energy crisis and the increasing awareness of environmental protection, people are paying more and more attention to clean energy. As the current mature utilization approach of clean energy, solar cells have become a research hotspot in the field of energy, using photovoltaic panels to convert photons radiated by the sun into electrical energy through semiconductor materials.

The generation of photovoltaic power requires a huge number of photovoltaic panels to form a solar cell array. Especially the solar photovoltaic power plants built in the desert area are spectacular in scale. As the service time goes by, the photovoltaic panels will inevitably be contaminated with dust and debris, which will affect the power generation efficiency of the photovoltaic panels. Therefore, the photovoltaic panels must be cleaned regularly. Due to the large number of photovoltaic panels, manual cleaning will encounter difficult working conditions and a huge workload, and it is not compatible with the development of industrial civilization.

In order to solve the above problems, the inventors of the present invention intensively conceived and actively studied for improvements, thereby developing and designing the present invention.

CONTENTS OF THE INVENTION

In view of the above situations, it is necessary to provide a cleaning robot, which is light in weight and allows one person to operate simultaneously more than three such robots, thereby greatly improving the cleaning efficiency.

The present invention claims a cleaning robot, which comprises the following components:
A supporting mechanism for supporting the cleaning robot;
a cleaning mechanism, which is symmetrically arranged at both ends of the supporting mechanism and used to clean the surface of the photovoltaic panel; and
a walking mechanism, which is arranged in the middle of the supporting mechanism, and used to fix the cleaning robot on the surface of the photovoltaic panel and drive the cleaning robot to move on the surface of the photovoltaic panel.

The supporting mechanism can adjust the cleaning range of the cleaning mechanism, so that the cleaning mechanism has at least a first cleaning range and a second cleaning range, which can be concentric circles.

In some examples, the supporting mechanism comprises the following components:
A bracket having two support rods; and
a first driving mechanism, which is arranged on the bracket and connected with the cleaning mechanism to adjust the cleaning range of the cleaning mechanism.

In some examples, the first driving mechanism comprises the following components:
A guide rail; and
a first driving member, having its body connected to the cleaning mechanism and its output end connected to the guide rail, such that it can drive the cleaning mechanism to move along the guide rail.

In some examples, the cleaning mechanism comprises the following components:
A casing having a mounting groove;
a rolling brush, which is arranged in the mounting groove and can be in contact with the photovoltaic panel; and
a second driving mechanism, which is arranged in the casing and connected with the rolling brush, so as to drive the rolling brush to rotate to remove dust from the surface of the photovoltaic panel.

In some examples, the second driving mechanism comprises the following components:
A transmission assembly connected with the rolling brush; and
a second driving member, which is connected to the transmission assembly and used to drive the rolling brush to rotate through the transmission assembly.

In some examples, the transmission assembly includes a gear set.

In some examples, there are at least two rolling brushes, and two of the rolling brushes are rotated in the opposite direction.

In some examples, the cleaning mechanism further comprises the following components:
A guide device, which is arranged above the rolling brush and used to guide the dust in the casing out; and
a dust collecting device, which is arranged on the guide device for collecting dust removed from the casing.

In some examples, the guide device comprises the following components:
An air deflector, which is provided with an air inlet as well as an air outlet located above the rolling brush and outside the casing; and
a fan, which is arranged in the air deflector to make the dust therein flow, so that the dust in the casing can flow out.

In some examples, the dust collecting device includes a non-woven bag with an elastic tightening mouth, with the non-woven bag sleeved at the air outlet.

In some examples, the walking mechanism comprises the following components:
A primary walking arm, which is arranged on the supporting mechanism and used to adjust the walking direction of the cleaning robot; and
a secondary walking arm, which is arranged on the cleaning mechanism and used to maintain the balance of the cleaning robot.

In some examples, the primary walking arm comprises the following components:
A first suction cup;
a third driving member, which is connected to the first suction cup and used to drive the first suction cup to be sucked on or detached from the photovoltaic panel; and
a fourth driving member, having its body fixed in the cleaning mechanism and its output end connected to the body of the first suction cup through a second transmission assembly, so as to drive the cleaning mechanism to rotate around the first suction cup.

In some examples, the secondary walking arm comprises the following components:
A second suction cup; and
a fifth driving member, which is connected to the second suction cup and used to drive the second suction cup to be sucked on or detached from the photovoltaic panel.

In some examples, the third driving member and the fifth driving member include a vacuum pump.

In some examples, the cleaning robot further comprises the following components:
A control box;
a power supply system, which is arranged on the control box and used to supply power to the cleaning robot; and
a control system, which is arranged in the control box and used to control the operation of the cleaning robot.

In some examples, the power supply system comprises the following components:
A first storage battery arranged in a power supply circuit; and
a second storage battery, which is arranged in the power supply circuit and electrically connected to the first storage battery in parallel.

In some examples, the control box is further provided with a handle.

In some examples, the handle is provided with a control switch, which is electrically connected with the control system to control the operation of the walking mechanism.

In some examples, the handle is provided on a symmetrical side wall with a state indicator, which is electrically connected to the control system.

The present invention further provides a method for cleaning with the above cleaning robot, which comprises the following steps:
The cleaning robot is placed on the photovoltaic panel to be cleaned, with the walking path of the cleaning robot kept parallel to the edge of the photovoltaic panel; the walking mechanism, the cleaning mechanism and the supporting mechanism are started, so that the cleaning robot begins to walk longitudinally on the photovoltaic panel to clean dust;
the walking mechanism drives the cleaning mechanism to rotatably clean within the first cleaning range; after the cleaning of the first cleaning range, the supporting mechanism adjusts the cleaning mechanism to the second cleaning range, and the walking mechanism drives the cleaning mechanism to rotatably clean within the second cleaning range;
after the cleaning of the second cleaning range, the walking mechanism drives the cleaning robot to travel longitudinally upward for a certain distance to continue the above cleaning;
when the cleaning robot reaches the side edge of the photovoltaic panel, it begins to walk a certain distance laterally to perform the cleaning again; and
the above actions are repeated.

Using the cleaning robot of the present invention has at least the following beneficial effects:
With the compact structure and light weight of the cleaning robot, a single person can operate multiple robots at the same time, which greatly improves the efficiency of on-site cleaning; through the cooperation between the supporting mechanism and the walking mechanism, the cleaning robot can automatically clean on the surface of the photovoltaic panel; the cleaning mechanism adopts double rolling brushes, which can sweep the photovoltaic panel cleaner; the combination of the double rolling brushes and the dust absorption improves the cleaning effect; in addition, the double rolling brushes can maintain balance, which is conducive to the stable operation of the cleaning robot.

BRIEF DESCRIPTION OF THE DRAWINGS

In order to more clearly illustrate the examples of the present invention or the technical solutions of the prior art, the drawings used in the description of the examples or the prior art will be briefly introduced below. Obviously, the drawings in the following description are only some examples of the present invention, and those skilled in the art can obtain other drawings according to the structures shown in these drawings without doing any inventive work.

The object realization, functional characteristics and advantages of the present invention will be further described in conjunction with the examples and drawings.

DETAILED DESCRIPTION OF THE EMBODIMENTS

The technical solution in the examples of the present invention will be described clearly and completely below in combination with the drawings in the examples of the present invention. Obviously, the examples described are only some instead of all of the examples of the present invention. All the other examples obtained by those of ordinary skill in the art based on the examples of the present invention without doing any inventive work shall fall within the scope of protection of the present invention.

It should be noted that all the directional terms (e.g. up, down, left, right, front, rear . . . ) adopted in illustrating the examples of the present invention are only used to describe the relative positional relationship, movement, etc. between the components in a specific orientation (as shown in the drawings); if the specific orientations changes, the directional terms will change accordingly.

Besides, the terms "first", "second" and the like adopted in illustrating the present invention are only used for descriptive purposes, and cannot be understood as indicating or implying their relative importance or implicitly specifying the number of indicated technical features; therefore, the features defined by "first" and "second" may be explicitly or implicitly indicated to include at least one of the features. Moreover, a technical solution described here with the term "and/or" includes three technical solutions; taking a technical solution of A and/or B as an example, it includes the A technical solution or the B technical solution, as well as the A and B technical solutions. In addition, the technical solutions of various examples can be combined, but the combination must be achieved by a person of ordinary skill in the art; when the combination of technical solutions is contradictory or cannot be achieved, it shall be considered that such a combination of technical solutions neither exists nor falls within the scope of protection of the present invention.

As shown in FIGS. 1-10, a cleaning robot for cleaning dust and debris on the surface of a photovoltaic panel comprises a supporting mechanism 10, a cleaning mechanism 20, and a walking mechanism 30; the supporting mechanism 10 is used to support the cleaning robot; the cleaning mechanism 20 is symmetrically arranged in pairs at both ends of the supporting mechanism 10 to clean the surface of the photovoltaic panel; the walking mechanism 30 can be arranged on the supporting mechanism 10 and the cleaning mechanism 20, so as to fix the cleaning robot on the surface of the photovoltaic panel and drive the cleaning robot to move on the surface of the photovoltaic panel; when the cleaning robot begins to work, the walking mechanism 30 first fixes the cleaning robot on the photovoltaic panel, and then the cleaning mechanism 20 is started to begin cleaning the photovoltaic panel; at this time, the walking mechanism 30 drives the cleaning mechanism 20 to rotate on the surface of the photovoltaic panel to clean the dust within the first cleaning range; after the cleaning mechanism 20 rotates once on the surface of the photovoltaic panel, the supporting mechanism 10 begins to adjust the cleaning range of the cleaning mechanism 20; after completion of the adjustment, the walking mechanism 30 continues to drive the started cleaning mechanism 20 to rotate on the surface of the photovoltaic panel to clean the dust within the second cleaning range; after one cleaning cycle is completed, the walking mechanism 30 drives the cleaning robot to move to the next photovoltaic panel, and then the cleaning robot performs the above cleaning cycle reciprocally until the cleaning work is completed.

The cleaning robot of the present invention is made of aviation materials, weighs less than 6 kg, and is easy to operate; cleaning with a cleaning robot instead of manual cleaning has high cleaning efficiency; the cleaning mechanism has different cleaning ranges, and the cleaning ranges can be expanded during the cleaning; after the cleaning, the cleaning mechanism can be stored, so as to save space and facilitate handling and carrying; and the walking mechanism is characteristic of three-point support, which is practical in making the cleaning robot work stably.

Figure 2:
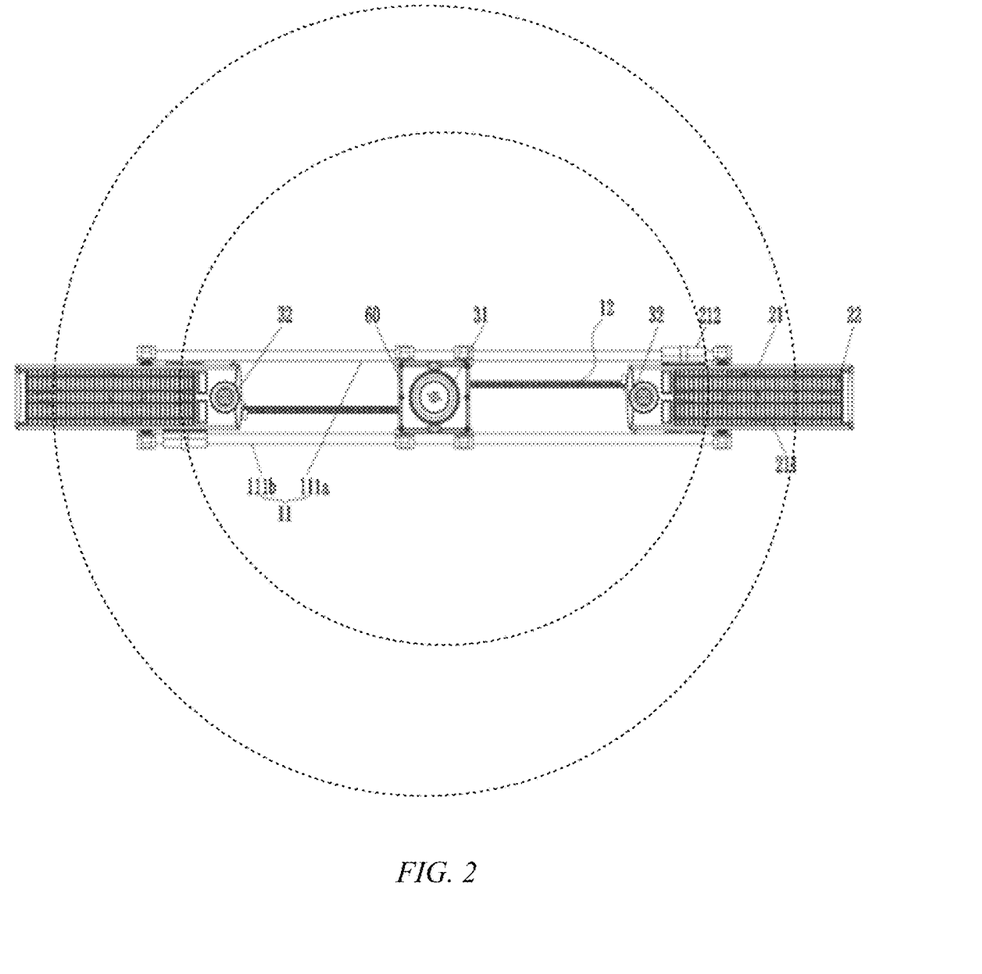
FIG. 2 is a bottom view of the cleaning robot of the present invention.

In some examples, the supporting mechanism comprises a bracket 11 and a first driving mechanism 12; the bracket 11 is composed of a first support rod 111a and a second support rod 111b arranged in parallel, and the first driving mechanism 12 is slidably arranged on the bracket 11 and connected with the cleaning mechanism 20; when the first driving mechanism 12 works, it can change the position of the cleaning mechanism 20 on the bracket 11, thereby adjusting the cleaning range of the cleaning mechanism 20, as shown in FIG. 2.

Figure 3:
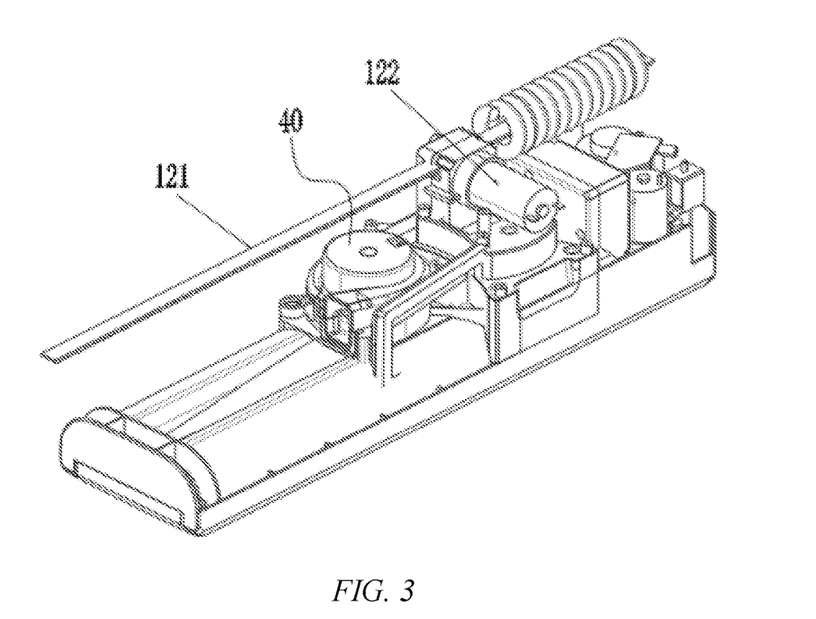
FIG. 3 is a schematic view showing the structure of the first driving mechanism of the cleaning robot of the present invention.

Further, the first driving mechanism 12 comprises a guide rail 121 and a first driving member 122; the guide rail 121 is preferably a synchronous belt, and the first driving member 122 is preferably a motor; the body of the motor is installed on the cleaning mechanism 20, and the teeth at the output end of the motor that match the synchronous belt engage with the synchronous belt; when the motor is started, it will drive the cleaning mechanism 20 to move along the synchronous belt to change the position of the cleaning mechanism 20 on the bracket 11, thereby adjusting the cleaning range of the cleaning mechanism 20, as shown in FIG. 3.

Further, both ends of the synchronous belt are fixed on the bracket 11, and the pulley at the output end of the motor runs on the synchronous belt to drive the cleaning assembly to move.

In some examples, the cleaning mechanism 20 comprises a casing 21, a rolling brush 22, and a second driving mechanism 23; the casing 21 is provided at the bottom with a mounting groove 211 for installation of the rolling brushes 22, and the rolling brushes 22, preferably two in number, are movably installed in pairs in the mounting groove 211; the second driving mechanism 23 is arranged in the casing 21 and connected to the rolling brush 22; when the second driving mechanism 23 works, it drives the rolling brush 22 to roll to clean the photovoltaic panel; it can be understood that when the rolling brush 22 cleans the photovoltaic panel, the bristles on the rolling brush 22 are in contact with the photovoltaic panel, as shown in FIG. 2.

Figure 10:
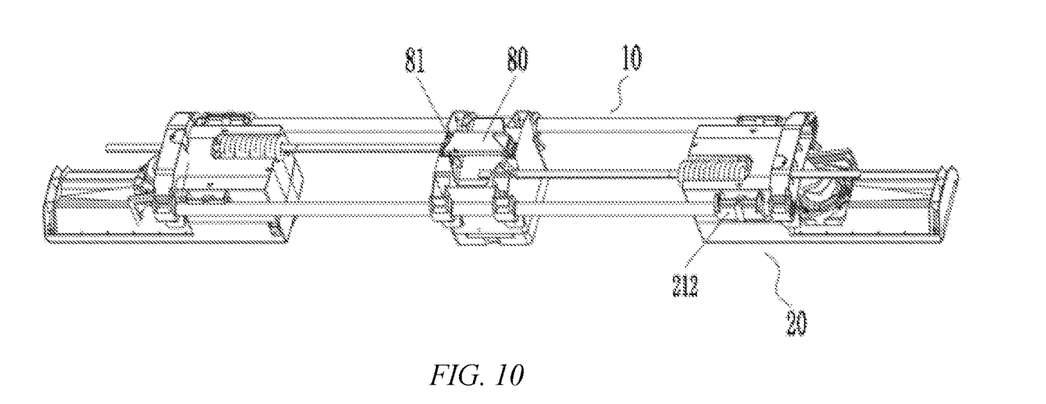
FIG. 10 is a schematic view showing the three-dimensional structure of the cleaning robot of the present invention when it is in the second cleaning range.
Figure 11:
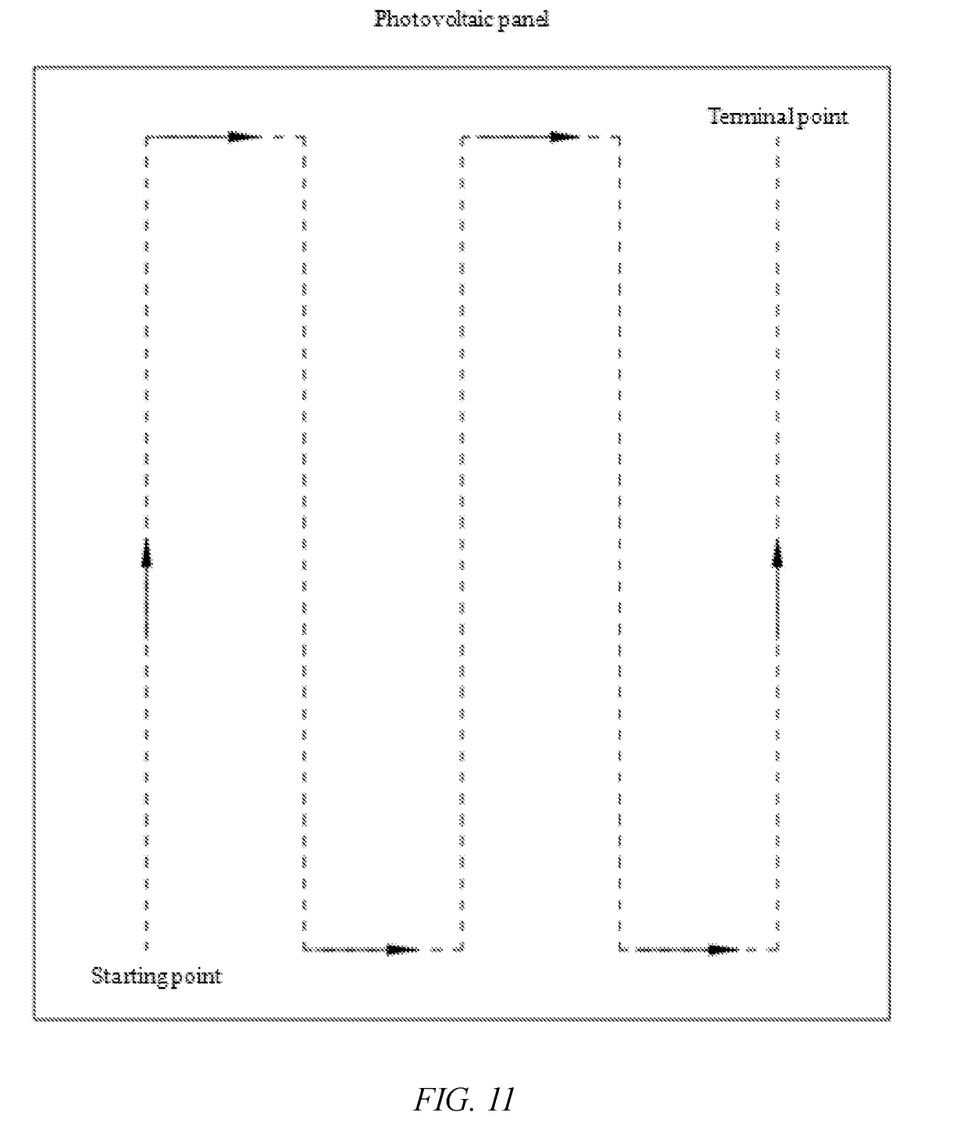
FIG. 11 is a schematic diagram showing the walking path of the cleaning robot of the present invention.
Figure 12:
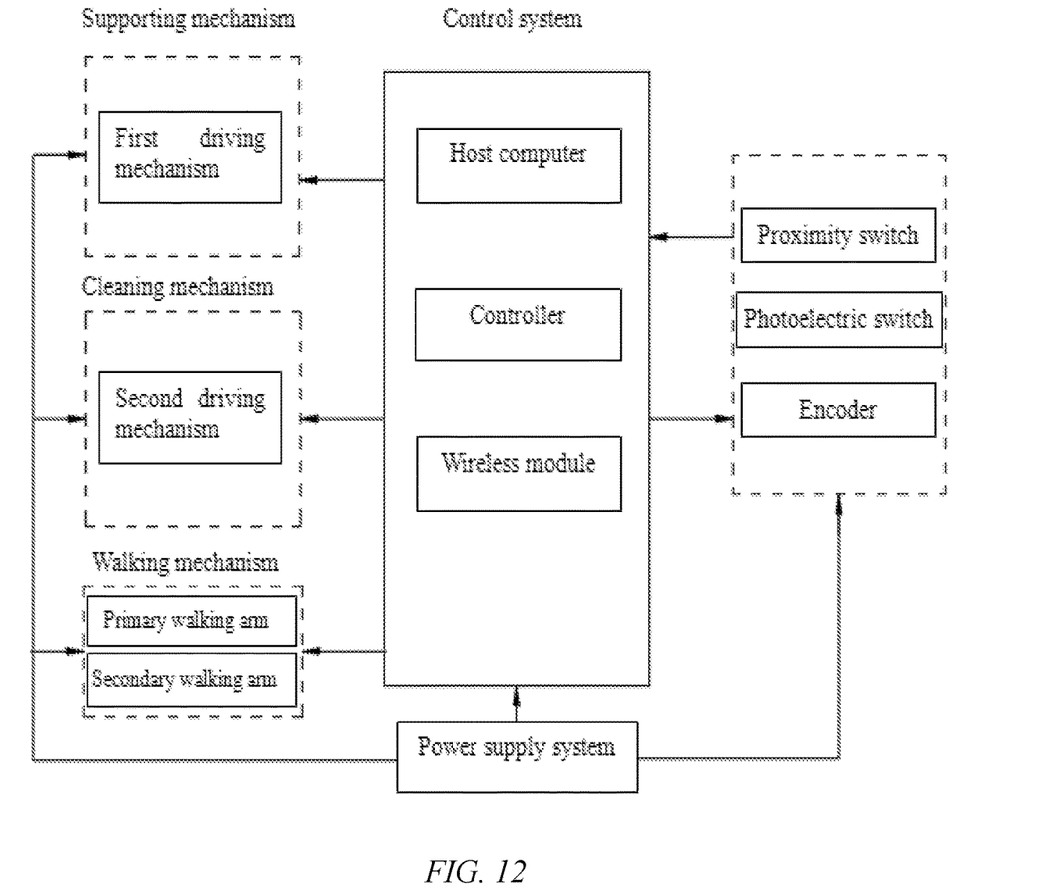
FIG. 12 is a block diagram showing the overall structure of the control system of the cleaning robot of the present invention.

Preferably, in order to facilitate the installation and disassembly of the casing 21, a buckle 212 is further provided on the casing 21; the casing 21 is connected to the first support rod 111a and the second support rod 111b by the elastic deformation of the buckle 212, and slidable on the first support rod 111a and the second support rod 111b through the buckle 212, thereby simplifying the structure and facilitating the installation and disassembly of the casing 21, as shown in FIGS. 2 and 10.

Figure 4:
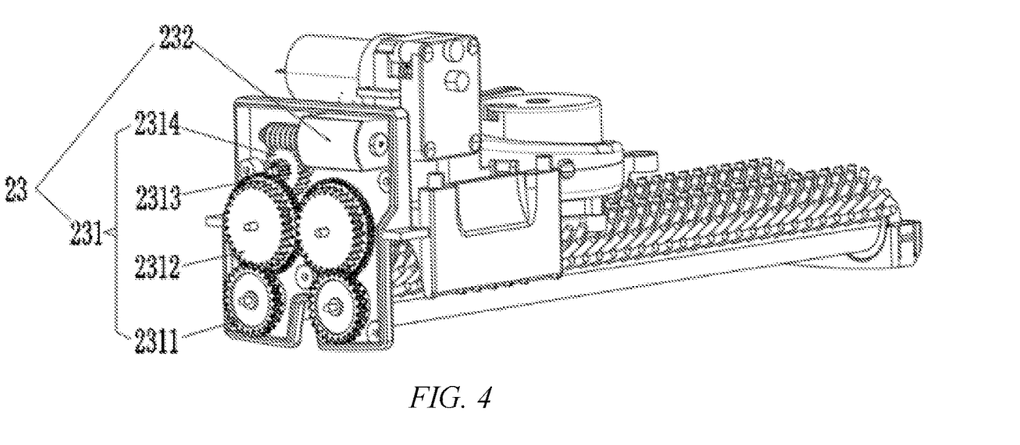
FIG. 4 is a schematic view showing the structure of the second driving mechanism of the cleaning robot of the present invention.

Further, the second driving mechanism 23 comprises a first transmission assembly 231 and a second driving member 232; the first transmission assembly 231 is preferably a gear set, comprising a first gear set 2311, a second gear set 2312, a third gear set 2313, and a fourth gear set 2314; the second driving member 232 is preferably a motor, which is provided at the output end with teeth that can mesh with the fourth gear set 2314; the first gear set 2311 is connected with the rolling brush 22, the second gear set 2312 is meshed with the first gear set 2311 and installed coaxially with the third gear set 2313, the third gear set 2313 is meshed with the fourth gear set 2314, and the four gear set 2314 is meshed with the teeth at the output end of the motor; when the motor works, the two rolling brushes 22 rotate in opposite directions through the linkage between the gear sets so as to clean dust, as shown in FIG. 4.

Figure 5:
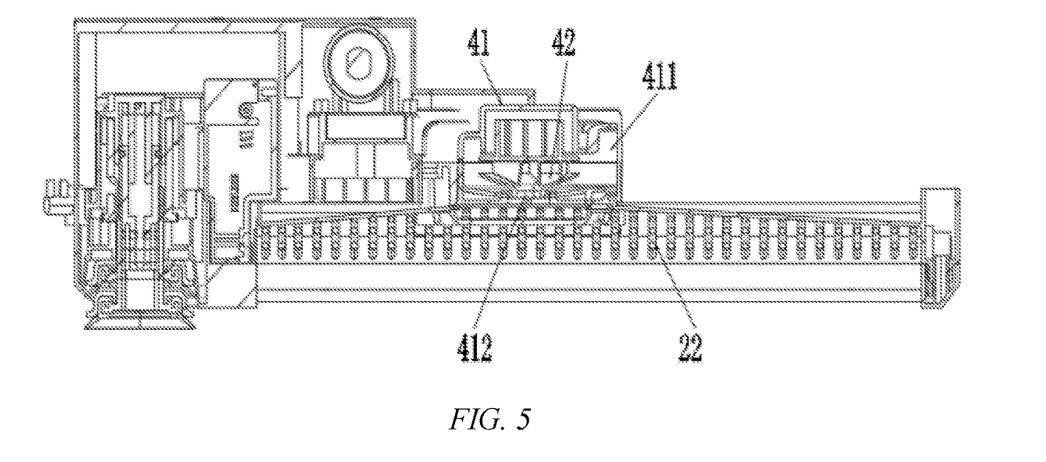
FIG. 5 is a cross-sectional view showing the structure of the cleaning mechanism of the cleaning robot of the present invention.

In some examples, the cleaning robot further includes a guide device 40 and a dust collecting device 50; the guide device 40 is arranged above the rolling brush 22 to guide the dust in the casing 21 out, and the dust collecting device 50 is arranged on the guide device 40 to collect the dust removed from the casing 21, as shown in FIGS. 3 and 5.

Specifically, the guide device 40 comprises an air deflector 41 and a fan 42; the air deflector 41 is provided with an air inlet 411 as well as an air outlet 412 located above the rolling brush 22 and outside the casing 21; the fan 42 is arranged in the air deflector 41 to make the dust therein flow, so that the dust in the casing 21 can flow out; when the fan 42 works, it drives the dust in the casing 21 to flow out, as shown in FIG. 5.

Figure 6:
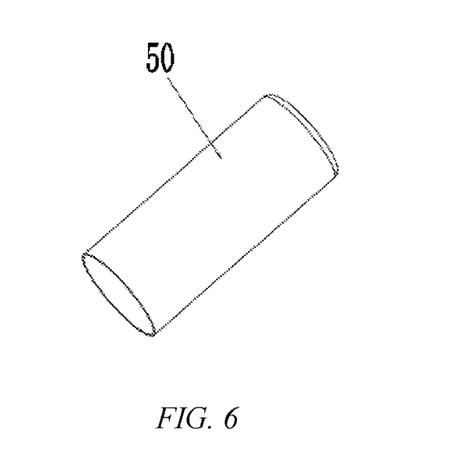
FIG. 6 is a schematic view showing the structure of the dust collecting device of the cleaning robot of the present invention.

The dust collecting device 50 includes a non-woven bag with an elastic tightening mouth; the non-woven bag is sleeved at the air outlet 412 to allow the dust from the air outlet 412 to accumulate in the non-woven bag, and it is removed from the air outlet 412 after the photovoltaic panels are cleaned; using the non-woven bag to collect dust makes the structure simple, the cost low, and the on-site operation convenient, without costing a lot of time for the cleaning of the dust box, as shown in FIG. 6.

Figure 7:
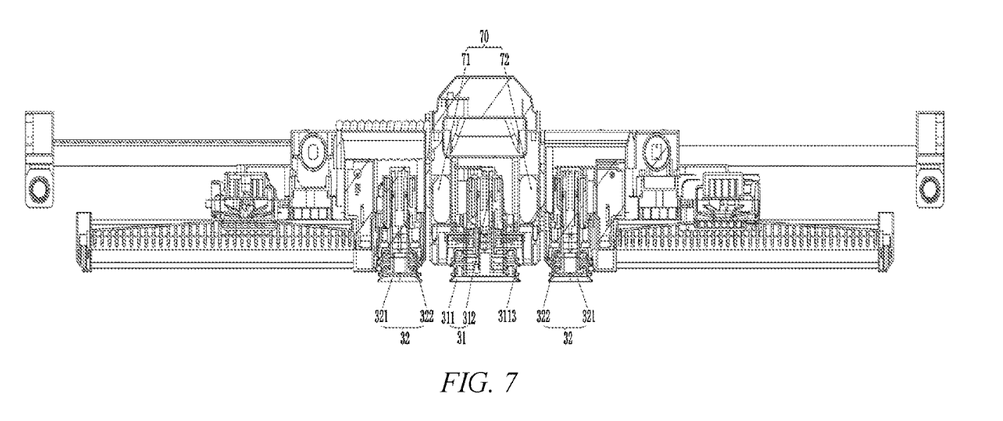
FIG. 7 is a cross-sectional view showing the structure of the cleaning robot of the present invention when it is in the first cleaning range.

In some examples, the walking mechanism 30 comprises a primary walking arm 31 and a secondary walking arm 32; the primary walking arm 31 is arranged on the supporting mechanism 10, and used to adjust the walking direction of the cleaning robot; the secondary walking arm 32 is arranged on the cleaning mechanism 20, and used to maintain the balance of the cleaning robot, as shown in FIG. 7.

Figure 8:
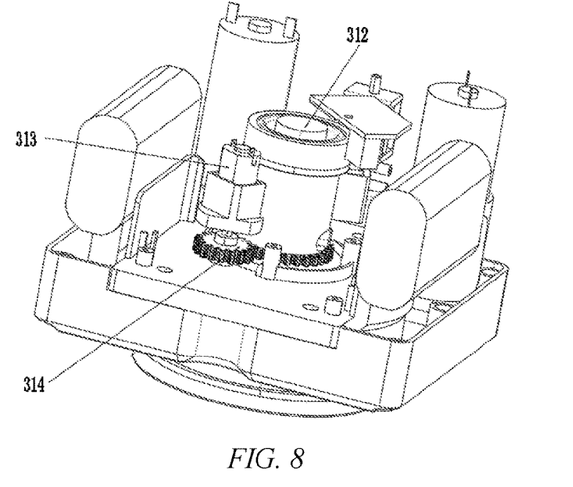
FIG. 8 is a schematic view showing the structure of the primary walking arm of the cleaning robot of the present invention.

Specifically, the primary walking arm 31 comprises a first suction cup 311, a third driving member 312, and a fourth driving member 313; the third driving member 312 is connected to the first suction cup 311, and used to drive the first suction cup 311 to be sucked on or detached from the photovoltaic panel; the fourth driving member 313 has its body fixed in the cleaning mechanism 20, and its output end connected to the body of the first suction cup 311 through the second transmission assembly 314; when the fourth driving member 313 works, the cleaning mechanism 20 will rotate around the first suction cup 311, as shown in FIGS. 7 and 8.

The secondary walking arm 32 comprises a second suction cup 321 and a fifth driving member 322; the fifth driving member 322 is connected to the second suction cup 321, and used to drive the second suction cup 321 to be sucked on or detached from the photovoltaic panel, as shown in FIG. 7.

In this example, both the third driving member 312 and the fifth driving member 322 are vacuum pumps.

Further, the vacuum pump has an air inlet and an air outlet, and is connected with two solenoid valves, which are a two-position three-way solenoid valve; the vacuum pump has its air inlet connected with the working port and air supply port of the first solenoid valve, and its air outlet connected with the working port and air supply port of the second solenoid valve and the working port of the first solenoid valve; the working port of the first solenoid valve and the exhaust port of the second solenoid valve are simultaneously connected with the suction cup.

When the two solenoid valves are not energized, air is extracted normally; when the solenoid valves are energized at the same time, air is extracted from the suction cup; with sucking and blowing realized through the cooperation between one vacuum pump and two solenoid valves, the first suction cup 311 and the second suction cup 321 are sucked on the photovoltaic panel during sucking, while they are detached from the photovoltaic panel during blowing, which makes the cleaning robot simple in structure and easy to control.

Figure 9:
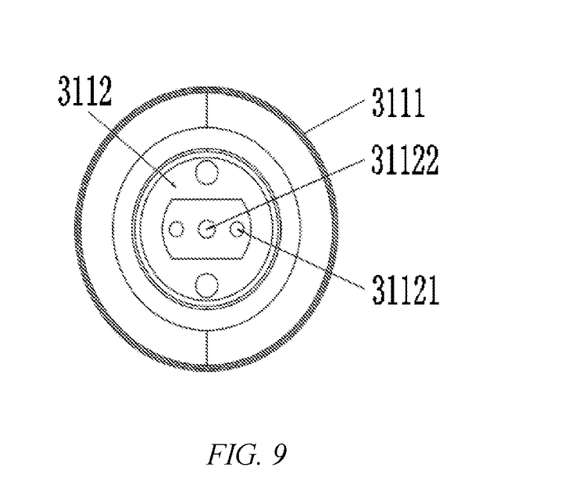
FIG. 9 is a schematic view showing the structure of the first suction cup of the cleaning robot of the present invention.

Further, the first suction cup 311 is of a sealed soft rubber structure; specifically, the first suction cup 311 comprises a suction cup body 3111 and a stationary bracket 3112 for supporting the suction cup body 3111, with a mounting hole 31121 provided on the stationary bracket 3112; during installation, a screw is passed through the mounting hole 31121 to connect the first suction cup 311 with the body of the cleaning robot, thus facilitating disassembly; correspondingly, an air hole 31122 is provided between the mounting holes 31121, as shown in FIG. 9.

Preferably, a gland 3113 is further provided on the top of the suction cup body 3111, and fixed on the stationary bracket 3112; the gland 3113 can generate pressure on the surface of the suction cup body 3111, so that the suction force in the suction cup body 3111 is more uniform, which is beneficial for the cleaning robot to walk on the photovoltaic panel more stably, as shown in FIGS. 7 and 9.

Of course, the cleaning robot shall further include a control box 60, a power supply system 70, and a control system; the power supply system 70 is arranged on the control box 60 to supply power for the cleaning robot, and the control system is arranged in the control box 60 to control the operation of the cleaning robot, as shown in FIG. 7.

Further, the power supply system 70 comprises a first storage battery 71 and a second storage battery 72; the first storage battery 71 is arranged in the power supply circuit, and the second storage battery 72 is arranged in the power supply circuit and electrically connected to the first storage battery 71 in parallel; specifically, with the second storage battery 72 as a backup battery for the cleaning robot, the cleaning robot mainly uses the first storage battery 71; through the management of the power management chip, the first storage battery 71 is preferentially used for power supply, as shown in FIG. 7.

Optionally, in order to facilitate the maintenance of the control system, the motherboard in the control system may be installed in a slot connection manner.

In some examples, the control box 60 is further provided with a handle 80, so as to facilitate one-handed operation by the staff and enable the staff to operate conveniently and quickly on site.

Further, the handle 80 is provided with a control switch 81, which is electrically connected with the control system to control the operation of the walking mechanism 30; specifically, the control switch 81 is long pressed to turn the cleaning robot on for cleaning, and short pressed to pause or start the cleaning robot; if the button is long pressed during standby, the cleaning robot will be subjected to air leakage first to remove the suction force of the suction cup, and then shut down, as shown in FIG. 10.

Figure 1:
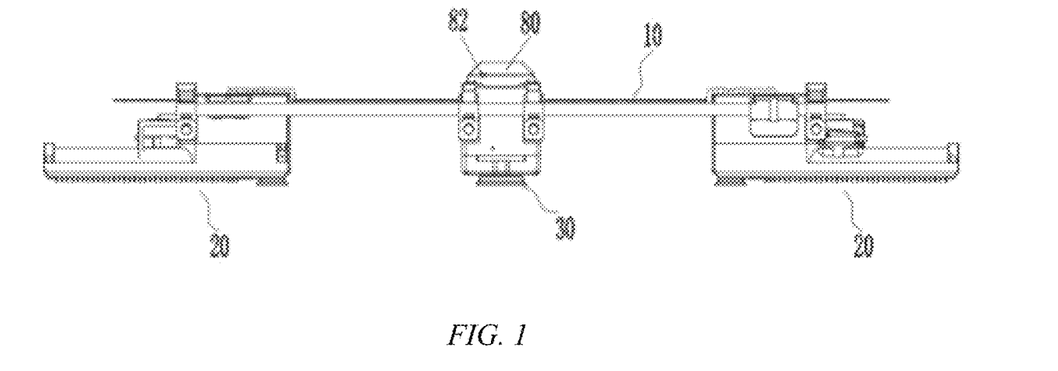
FIG. 1 is a front view of the entire cleaning robot of the present invention.

Optionally, the handle 80 is provided on a symmetrical side wall with a state indicator 82, which is electrically connected to the control system; when working in the field, the staff can clearly know the working state of the cleaning robot through the state indicated by the state indicator 82; the cleaning robot is in a state of alarming when the state indicator 82 emits blue light, and in a state of cleaning termination when the state indicator 82 emits white light, making the state of the cleaning robot very intuitive, as shown in FIG. 1.

Those skilled in the art can understand that the cleaning robot shown in FIGS. 1-12 does not limit the cleaning robot of the present invention, which may include more or less components than the illustrated cleaning robot, or a combination of some components, or a different arrangement of components.

Figure 13:
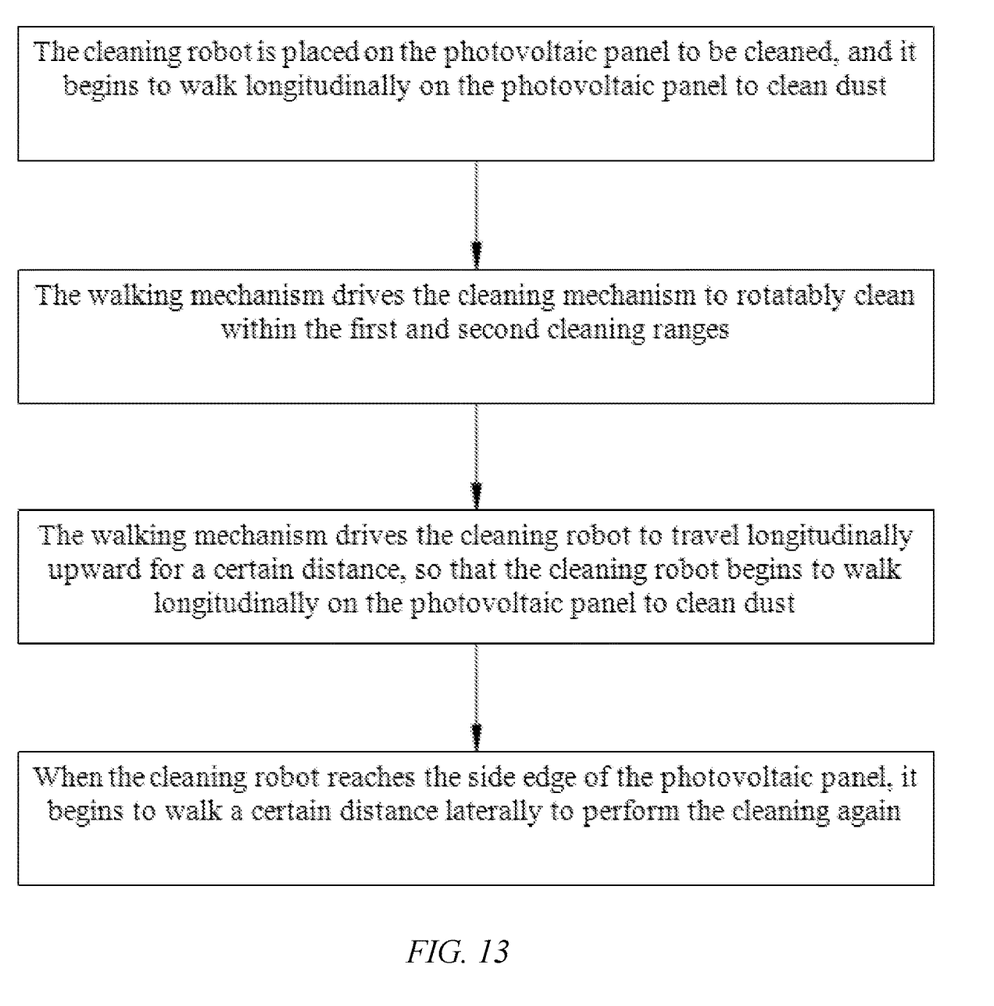
FIG. 13 is a flowchart showing the cleaning method of the cleaning robot of the present invention.

FIG. 13 is a flowchart of a cleaning method according to an example of the present invention. This method can be used in the cleaning of photovoltaic panels by the cleaning robot shown in FIGS. 1-12, comprising the following steps:

Step 201: the cleaning robot is placed on the photovoltaic panel to be cleaned, with the walking path of the cleaning robot kept parallel to the edge of the photovoltaic panel; the walking mechanism, the cleaning mechanism and the supporting mechanism are started, so that the cleaning robot begins to walk longitudinally on the photovoltaic panel to clean dust;

step 202: the walking mechanism drives the cleaning mechanism to rotatably clean within the first cleaning range; after the cleaning of the first cleaning range, the supporting mechanism adjusts the cleaning mechanism to the second cleaning range, and the walking mechanism drives the cleaning mechanism to rotatably clean within the second cleaning range;

step 203: after the cleaning of the second cleaning range, the walking mechanism drives the cleaning robot to travel longitudinally upward for a certain distance to continue the cleaning in step 202;

step 204: when the cleaning robot reaches the side edge of the photovoltaic panel, it begins to walk a certain distance laterally to perform the cleaning in step 202 again; and step 205: the above actions are repeated until the cleaning of the photovoltaic panel is completed.

The above examples are only preferred ones of the present invention, and do not limit the patent scope of the present invention. Any equivalent structural transformations made with the inventive concept of the present invention using the contents of the description and drawings of the present invention, or those directly/indirectly applied in other related technical fields, are included in the scope of patent protection of the present invention.

The invention claimed is:

1. A cleaning robot for cleaning photovoltaic panels, characterized in that it comprises the following components:
   a supporting mechanism for supporting the cleaning robot;
   a cleaning mechanism, which includes two cleaning units that are symmetrically arranged at both ends of the supporting mechanism and used to clean a surface of the photovoltaic panel; and
   a walking mechanism, which is arranged in a middle of the supporting mechanism, and used to fix the cleaning robot on the surface of the photovoltaic panel and drive a cleaning robot to move on the surface of the photovoltaic panel;
   wherein the supporting mechanism comprises a bracket having two support rods; and a first driving mechanism, the first driving mechanism being arranged on the bracket and connected with the cleaning mechanism, the cleaning mechanism having a first cleaning range and a second cleaning range, the first cleaning range and the second cleaning range being concentric circles, the two cleaning units rotatably cleaning within the first cleaning range and the second cleaning range sequentially; and
   wherein the first driving mechanism comprises: a guide rail and a first driving member, the first driving member being connected to the cleaning mechanism and having an output end connected to the guide rail, the first driving member driving the cleaning mechanism to move along the guide rail from a first position to a second position, the first position corresponding to the first cleaning range, and the second position corresponding to the second cleaning range.

2. The cleaning robot according to claim 1, characterized in that the cleaning mechanism comprises the following components: a casing having a mounting groove; a rolling brush, which is arranged in the mounting groove and can be in contact with the photovoltaic panel; and a second driving mechanism, which is arranged in the casing and connected with the rolling brush, so as to drive the rolling brush to rotate to remove dust from the surface of the photovoltaic panel.

3. The cleaning robot according to claim 2, characterized in that the second driving mechanism comprises the following components: a transmission assembly connected with the rolling brush; and a second driving member, which is connected to the transmission assembly and used to drive the rolling brush to rotate through the transmission assembly.

4. The cleaning robot according to claim 3, characterized in that: the transmission assembly includes a gear set.

5. The cleaning robot according to claim 4, characterized in that: there are at least two rolling brushes, and two of the rolling brushes are rotated in an opposite direction.

6. The cleaning robot according to claim 2, characterized in that the cleaning mechanism further comprises the following components: a guide device, which is arranged above the rolling brush and used to guide the dust in the casing out; and a dust collecting device, which is arranged on the guide device for collecting dust removed from the casing.

7. The cleaning robot according to claim 6, characterized in that the guide device comprises the following components: an air deflector, which is provided with an air inlet as well as an air outlet located above the rolling brush and outside the casing; and a fan, which is arranged in the air deflector to make the dust therein flow, so that the dust in the casing can flow out.

8. The cleaning robot according to claim 7, characterized in that: the dust collecting device includes a non-woven bag with an elastic tightening mouth, with the non-woven bag sleeved at the air outlet.

9. The cleaning robot according to claim 1, characterized in that the walking mechanism comprises the following components: a primary walking arm, which is arranged on the supporting mechanism and used to adjust a walking direction of the cleaning robot; and a secondary walking arm, which is arranged on the cleaning mechanism and used to maintain a balance of the cleaning robot.

10. The cleaning robot according to claim 9, characterized in that the primary walking arm comprises the following components: a first suction cup; and a third driving member, which is connected to the first suction cup and used to drive the first suction cup to be sucked on or detached from the photovoltaic panel; and a fourth driving member, having its body fixed in the cleaning mechanism and its output end connected to the body of the first suction cup through a second transmission assembly, so as to drive the cleaning mechanism to rotate around the first suction cup.

11. The cleaning robot according to claim 10, characterized in that the secondary walking arm comprises the following components: a second suction cup; and a fifth driving member, which is connected to the second suction cup and used to drive the second suction cup to be sucked on or detached from the photovoltaic panel.

12. The cleaning robot according to claim 11, characterized in that: the third driving member and the fifth driving member include a vacuum pump.

13. The cleaning robot according to claim 1, characterized in that the cleaning robot further comprises the following components: a control box; a power supply system, which is arranged on the control box and used to supply power to the cleaning robot; and a control system, which is arranged in the control box and used to control the operation of the cleaning robot.

14. The cleaning robot according to claim 13, characterized in that the power supply system comprises the following components: a first storage battery arranged in a power supply circuit; a second storage battery, which is arranged in the power supply circuit and electrically connected to the first storage battery in parallel.

15. The cleaning robot according to claim 13, characterized in that: the control box is further provided with a handle.

16. The cleaning robot according to claim 15, characterized in that: the handle is provided with a control switch, which is electrically connected with the control system to control the operation of the walking mechanism.

17. The cleaning robot according to claim 15, characterized in that: the handle is provided on a symmetrical side wall with a state indicator, which is electrically connected to the control system.

18. A method for cleaning photovoltaic panels, used by the cleaning robot according to claim 1, characterized in that this method comprises the following steps:
the cleaning robot is placed on the photovoltaic panel to be cleaned, with a walking path of the cleaning robot kept parallel to an edge of the photovoltaic panel;
the walking mechanism, the cleaning mechanism and the supporting mechanism are started, so that the cleaning robot begins to walk longitudinally on the photovoltaic panel to clean dust;
the walking mechanism drives the cleaning mechanism to rotatably clean within the first cleaning range;
after the cleaning of the first cleaning range, the supporting mechanism adjusts the cleaning mechanism to the second cleaning range, and the walking mechanism drives the cleaning mechanism to rotatably clean within the second cleaning range; after the cleaning of the second cleaning range, the walking mechanism drives the cleaning robot to travel longitudinally upward for a certain distance to continue the above cleaning;
when the cleaning robot reaches the side edge of the photovoltaic panel, it begins to walk a certain distance laterally to perform the cleaning again; and the above actions are repeated,
wherein the supporting mechanism comprises a bracket having two support rods; and a first driving mechanism, the first driving mechanism being arranged on the bracket and connected with the cleaning mechanism; and
wherein the first driving mechanism comprises: a guide rail and a first driving member, the first driving member being connected to the cleaning mechanism and having an output end connected to the guide rail, the first driving member driving the cleaning mechanism to move along the guide rail from a first position to a second position, the first position corresponding to the first cleaning range, the second position corresponding to the second cleaning range, and the first cleaning range and the second cleaning range being concentric circles.

* * * * *